(12) United States Patent
Geiss

(10) Patent No.: US 6,230,843 B1
(45) Date of Patent: May 15, 2001

(54) DEVICE TO PRODUCE A FINE OIL MIST

(75) Inventor: Artur Geiss, Maulbronn (DE)

(73) Assignee: Acculube Manufacturing GmbH, Maulbronn (DE)

( * ) Notice: Subject to any disclaimer, the term of this patent is extended or adjusted under 35 U.S.C. 154(b) by 0 days.

(21) Appl. No.: 09/333,292

(22) Filed: Jun. 15, 1999

(30) Foreign Application Priority Data

Jun. 27, 1998 (DE) .......................................... 298 11 504 U

(51) Int. Cl.$^7$ .......................................................... F16N 7/34
(52) U.S. Cl. ............................................ 184/55.2; 239/338
(58) Field of Search .................................. 184/55.2, 6.26; 261/78.2; 239/338

(56) References Cited

U.S. PATENT DOCUMENTS

| | | | |
|---|---|---|---|
| 1,839,193 | * | 1/1932 | Blanchard ...................... 239/338 X |
| 1,945,464 | * | 1/1934 | Thomas ........................... 184/55.2 X |
| 2,245,600 | * | 6/1941 | Medsker ........................... 184/55.2 |
| 2,675,214 | * | 4/1954 | Wendell ........................... 239/338 X |
| 2,718,934 | * | 9/1955 | Norgren et al. ................... 184/55.2 |
| 3,243,014 | * | 3/1966 | Bjorklund ........................ 184/55.2 |
| 4,116,387 | * | 9/1978 | Kremer et al. .................... 239/338 |

* cited by examiner

Primary Examiner—Rodney H. Bonck
(74) Attorney, Agent, or Firm—Lowe Hauptman Gilman & Berner, LLP

(57) ABSTRACT

A device for producing a fine oil mist for preferred use in the lubrication of tools used for machining metal includes a vapourising chamber into which a supply line containing oil and air under pressure enters. The oil and air is sprayed through a vapourising nozzle into the vapourising chamber to form the mist. The mist travels from the vapourising chamber into the second chamber through a connection therebetween located in the vapourising chamber at an end opposite the end at which the vapourising nozzle is located. The mist travels through the second chamber and enters an outlet line where the mist is conducted from the device to a place of lubricating application.

7 Claims, 1 Drawing Sheet

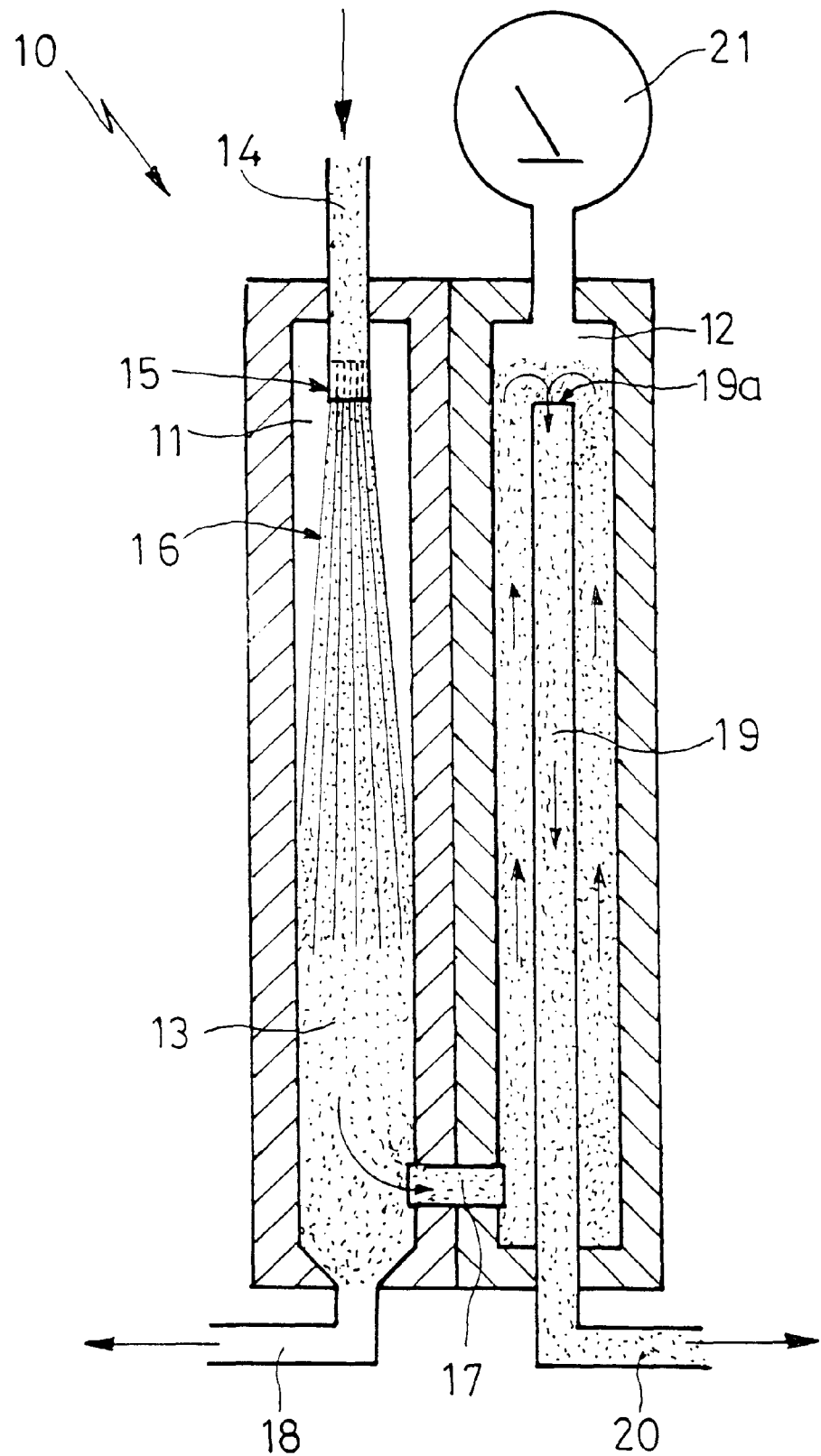

DEVICE TO PRODUCE A FINE OIL MIST

BACKGROUND OF THE INVENTION

The invention concerns a device to produce a fine oil mist, in particular for the lubrication of tools used when removing metal by machining, comprising a vapourising chamber into which oil and air under pressure enters through a supply line, a vapourising nozzle provided within the vapourising chamber at the end of the supply line and an outlet line for the transport of the aerosol produced in the chamber to a place of application.

The invention particularly concerns a device, with which an oil mist, having a smoke-like appearance, is produced, to provide minimum lubrication of the tools and work pieces during their machining. A preferred field of application relates to the supply of an internal minimum quantity of lubrication through the spindle of the machine of machine tools.

When such oil mist with the absolutely minimum oil concentration is applied, it is particularly important that the oil in the air is extremely, i.e. microscopically, distributed. Only in that case can it be reliably ensured that the oil mist is adequate for the lubrication of the work piece and of the tool yet does not precipitate therein a disadvantageous manner. Device for producing a fine oil mist are known, and can be mounted on an oil tank in such a manner that the vapourising chamber thereof is arranged above the oil tank, and separated therefrom by means of a metal separating sheet. On the underside of the oil tank, oil is fed by means of a piston pump which conveys oil and air through a coaxial double hose via the swirl chamber situated below the oil tank at a pressure of 0.6–1.0 MPa. The line ends in a vapourising nozzle having a diameter of approx. 1.8 mm in the interior of the swirl chamber. The oil, vapourised under influence of the highly compressed air, is supplied in the form of a mist to an outlet line opening into the swirl chamber and is conveyed through hoses and/or pipes to the place of application, in particular to the tool of a machine tool.

The separating metal sheet, provided between the oil tank and the swirl chamber, does not abut tightly against the wall of the system, so that oil drops or an oil film, which precipitate in the swirl chamber, can be collected in the oil tank situated below it for reuse.

A very fine oil mist can be produced with the known device by economically using oil, which is acceptable for numerous applications.

The present invention, however, attempts a further improvement in the production of oil mist in such a manner that an oil mist, containing extremely fine and homogeneously distributed oil particles, can be produced with even greater reliability and dependability.

SUMMARY OF THE INVENTION

This objective is achieved with an oil mist producing device in accordance with which features a vapourising chamber having a connection to a second chamber at a location which is distanced from the vapourising nozzle, and wherein the outlet line is introduced into the second chamber and extends almost along its entire length.

The basic principle of the invention is that the oil mist produced in the vapourising chamber is propelled through the second chamber, wherein there is the possibility that the small oil particles produced in the vapourising chamber are split further, i.e. they are reduced in their size and that undesirable large particles precipitate with greater reliability during the preparation of the oil mist.

To achieve this, the second chamber, provided downstream from the vapourising chamber, ensures that the oil mist does not enter directly into the outlet line but first passes through the second chamber. In this manner, only small oil particles, particularly those capable of floating, can enter into the outlet line, whereas heavier particles are collected in the second chamber or precipitate on its walls.

The device according to the invention can be constructed in a particularly compact manner, thus providing an added advantage. In particular, the device to produce the fine oil mist is not firmly connected physically to an oil tank and subject to its size, but is a separate unit which, in addition to the oil tank or oil supply container, comprises the pump necessary to produce the pressure as well as the associated hose and/or pipes as well as a housing for the apparatus.

BRIEF DESCRIPTION OF THE INVENTION

The invention is best understood based on the following detailed explanation of an embodiment illustrated in the attached drawing.

The drawing shows a longitudinal section through the device to produce a fine oil mist and its essential parts in an approximately actual scale.

DETAILED DESCRIPTION OF THE INVENTION

The device generally designated by reference by reference numeral 10 comprises a first chamber 11 and a second chamber 12 connected thereto in a fluid-conveying manner. Each of chambers 11 and 12 extends longitudinally and has a cross-section which is small relative to the respective length thereof.

The first chamber 11 functions as a "vapourising chamber" to produce an oil mist 13. As the drawing shows, a supply line 14, enters through the top face of the vapourising chamber 11 and conveys a small quantity of oil and a large quantity of air under a relatively high pressure of approx. 0.6–1.0 MPa.

The upsteam end (not shown) of the supply line 14 is connected to a pump, e.g. a frequency-controlled or stroke-controlled piston pump, which supplies air as well as oil from an oil supply container (also not shown).

A vaporizing nozzle 15 is located at the end of the supply line 14 which opens into the vapourising chamber 11. According to a preferred embodiment, this vapourising nozzle 15 has a plurality of outlet orifices or outlet channels, e.g. six, having very small diameters.

The lines interspersed with dots in the drawing represents the jet 16 exiting from the vapourising nozzle 15 under pressure, which is composed of air and oil, whereby the compressed air splits the oil into a plurality of as small a particle as possible, until an oil mist, designated by 13, will be present in the bottom region of the device.

The vapourising chamber 11 is connected with the second chamber 12. This connection, for example in the form of a small tube or two bores aligned with each other in the walls of the chambers, is designated by 17 in the drawing. This connection 17 is close to, but above the bottom end of the vapourising chamber 11. This spacing will enable the aerosol, containing the finest oil particles to enter (as illustrated by the curved arrow) the second chamber 12 from chamber 11 via the connection 17, whereas the oil particles which are too heavy for such transport or the oil adhering to the walls of the vapourising chamber 11, can precipitate further towards the bottom of the vapourising chamber 11, for entry and recollection with an oil collecting line 18.

The oil collecting line 18 also acts as a return line for the precipitated oil to the oil supply container (not illustrated) in which the oil, supplied to the supply line 14, is stored.

An outlet line 19, for example in the form of a small tube, protrudes into the second chamber 12. The purpose of this outlet line 19 is to supply the aerosol 20 conveyed therethrough to the place of application.

As it is further shown in the drawing, the outlet line 19 extends through the second chamber 12 for almost its entire length. Consequently, the oil mist 13 has to pass through the second chamber 12 before it enters into the orifice 19a of the outlet line 19. This will ensure that a selection between very light suspended oil particles and heavier oil particles takes place again and only the smallest possible oil particles of the oil mist can be conveyed via the outlet line to the work piece or tool. Heavier particles or those which cannot be split further during the movement of the oil mist 13 through the second chamber 12, can precipitate on the walls of the second chamber 12 or collected on its bottom and finally returned to the oil collecting or oil return line 18 via the connection 17.

The outlet line 19 extends centrally within and along the length of the second chamber 12. This has the advantage that the oil mist transported in the second chamber 12 can contact considerable surfaces formed by the internal wall of the chamber 12 and the external jacket of the line 19, so that th( probability of larger oil particles adhering to them is increased.

A pressure gauge 21 is connected to the second chamber 12 to control the proper operation or interruptic of the device by monitoring the operating pressure.

The two chambers 11 and 12 are of equal size and joined directly next to each other to form a block-like compact unit.

The preferred operating position of the illustrated device corresponds to that of the drawing, i.e. the oil and the air enter into the vapourising chamber 11 from above, and the oil mist 13 entering from the vapourising chamber 11 into the second chamber 13 via the connection 17 rises in the second chamber 12 from below, so that, within reason, gravity may also have a positive influence on the production of very finely distributed oil in the oil mist within the chamber 12.

However, it has to be pointed out, that the device can satisfactorily work even in the horizontal position, instead of the vertical one, as illustrated; in particular with the vapourising chamber 11 arranged below the second chamber 12. However, to retain in this case a reliable oil precipitation from the vapourising chamber 11, the oil collecting line 18 ha to be provided not on the narrow face of the vapourising chamber 11 but on its bottom, which in this case is a longitudinal wall.

What is claimed is:

1. A device to produce a fine oil mist, comprising a vapourising chamber into which a supply line conveying oil and air under pressure enters, a vapourising nozzle provided within the vapourising chamber at an end of the supply line, and an outlet line for transport of aerosol produced in the chamber to a place of application, and further comprising a second chamber, said vapourising chamber (11) having a connection (17) to the second chamber (12) at a location spaced from the vapourising nozzle (15), said outlet line (19) extending along an entire length of and within the second chamber (12).

2. A device according to claim 1, wherein the vapourising chamber (11) has a cross-section which is small relative to a length thereof, said supply line (14) enters into the vapourising chamber (11) essentially in a longitudinal direction of the vapourising chamber, and the connection (17) with the second chamber (12) is provided in the vapourising chamber (11) in the vicinity of an end which is remote from the vapourising nozzle (14).

3. A device according to claim 1, further comprising an oil collecting line (18) connected to an underside of the vapourising chamber (11).

4. A device according to claim 1, wherein the second chamber (12) is arranged parallel to and adjacent the vapourising chamber (11), and said outlet line (19) having an inlet located at an end of the second chamber (12) proximate a side of the device where the supply line (14) enters into the vapourising chamber (11).

5. A device according to claim 1, wherein each of the supply line (14) and the outlet line (19) extend essentially longitudinally centrally in the respective vapourising and second chambers (11; 12).

6. A device according to claim 1, wherein the connection (17) between the two chambers (11; 12) includes bores in bordering walls of th chambers, said bores being aligned with each other.

7. A device according to claim 6, wherein both chambers (11; 12) are of substantially the same size and are situated congruently next to or above each other into a compact total device (10).

* * * * *